(12) United States Patent  
Itamura (10) Patent No.: US 7,562,490 B1
(45) Date of Patent: Jul. 21, 2009

(54) FISH HOOK REMOVER SYSTEM (76) Inventor: John Itamura, 3359 Zenobia Way, Sacramento, CA (US) 95834

( * ) Notice: Subject to any disclaimer, the term of this patent is extended or adjusted under 35 U.S.C. 154(b) by 29 days.

(21) Appl. No.: 11/672,459

(22) Filed: Feb. 7, 2007

(51) Int. Cl.
A01K 97/00 (2006.01)
(52) U.S. Cl. ....................................................... 43/53.5
(58) Field of Classification Search .................. 43/53.5;
D22/149
See application file for complete search history.

(56) References Cited

U.S. PATENT DOCUMENTS

| D157,256 S | * | 2/1950 | Hamel | D22/149 |
| 2,519,098 A | * | 8/1950 | Aye | 43/53.5 |
| 3,009,280 A | * | 11/1961 | Hunter et al. | 43/53.5 |
| 3,377,735 A | * | 4/1968 | Daughtry | 43/53.5 |
| 3,670,448 A | * | 6/1972 | Wehmeyer | 43/53.5 |
| 3,680,248 A | | 8/1972 | Wilkinson | |
| 3,713,243 A | * | 1/1973 | Tetzner | 43/53.5 |
| 3,835,574 A | * | 9/1974 | Harwood | 43/53.5 |
| 4,014,130 A | * | 3/1977 | Roberts | 43/53.5 |
| 4,014,131 A | * | 3/1977 | Bendik | 43/53.5 |
| 4,882,871 A | * | 11/1989 | Marina | 43/53.5 |
| 4,947,576 A | * | 8/1990 | Hull et al. | 43/53.5 |
| 5,084,999 A | * | 2/1992 | Henry | 43/53.5 |
| 5,138,791 A | * | 8/1992 | Coes | 43/53.5 |
| 5,307,586 A | * | 5/1994 | Palmer | 43/53.5 |
| 5,934,009 A | * | 8/1999 | Trahan | 43/53.5 |

* cited by examiner

Primary Examiner—Kurt Rowan (57) ABSTRACT

A fish hook remover system for efficiently removing a fish hook from a fish. The fish hook remover system generally includes an elongated member including a first end and a second end, a catch member extending from the first end of the elongated member and a bulge portion extending from adjacent the first end, wherein the bulge portion extends outwardly from the elongated member. At least a portion of the bulge portion is between the catch member and the elongated member.

1 Claim, 9 Drawing Sheets

FISH HOOK REMOVER SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to fish hook removers and more specifically it relates to a fish hook remover system for efficiently removing a fish hook from a fish.

2. Description of the Related Art

Any discussion of the prior art throughout the specification should in no way be considered as an admission that such prior art is widely known or forms part of common general knowledge in the field.

Fish hook removers have been in use for years. Typically, fish hook removers are utilized to dislodge a fish hook from inside the fish's mouth or throat. When fishing it is not uncommon for a fish to partially swallow your hook making it difficult to remove the fish hook from the fish.

Prior art utilizing in fish hook removal has been known, wherein the prior art generally includes pliers, forceps or the like. It may be difficult to precisely locate the fish hook within the fish while utilizing the pliers or forceps, thus increasing the likelihood to cause damage to the fish while removing the hook. Because of the general lack of efficiency and practicality in the prior art there is the need for a new and improved fish hook remover system for efficiently removing a fish hook from a fish.

BRIEF SUMMARY OF THE INVENTION

The general purpose of the present invention is to provide a fish hook remover system that has many of the advantages of the fish hook removers mentioned heretofore. The invention generally relates to a fish hook remover which includes an elongated member including a first end and a second end, a catch member extending from the first end of the elongated member and a bulge portion extending from adjacent the first end, wherein the bulge portion extends outwardly from the elongated member. At least a portion of the bulge portion is between the catch member and the elongated member.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a fish hook remover system for efficiently removing a fish hook from a fish.

Another object is to provide a fish hook remover system that is lightweight.

An additional object is to provide a fish hook remover system that is easy to use.

A further object is to provide a fish hook remover system that is ergonomically formed.

Another object is to provide a fish hook remover system that may be utilized with a variety of styles of fish hooks.

Another object is to provide a fish hook remover system that is adaptable for use with both right and left handed users.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Turning now descriptively to the drawings, in which similar reference characters denote similar elements throughout the several views, FIGS. 1 through 9 illustrate a fish hook remover system 10, which comprises an elongated member 40 including a first end and a second end, a catch member 50 extending from the first end of the elongated member 40 and a bulge portion 48 extending from adjacent the first end, wherein the bulge portion 58 extends outwardly from the elongated member 40. At least a portion of the bulge portion 48 is between the catch member 50 and the elongated member 40.

B. Body

The body 20 is comprised of a substantially lightweight material. The body 20 is preferably comprised of a plastic material; however it is appreciated that the body 20 may be comprised of various materials rather than the preferred embodiment, such as but not limited to metal or wood. The body 20 is further preferably comprised of polyethylene reinforced nylon plastic.

The body 20 is ergonomically formed to be easily grasped by the user. The body 20 is preferably comprised of an integrally formed structure; however it is appreciated that the body 20 may be comprised of separate structures. The body 20 includes a handle 30, an elongated member 40 and a catch member 50 as illustrated in FIGS. 1 through 9.

i. Handle

Figure 1:
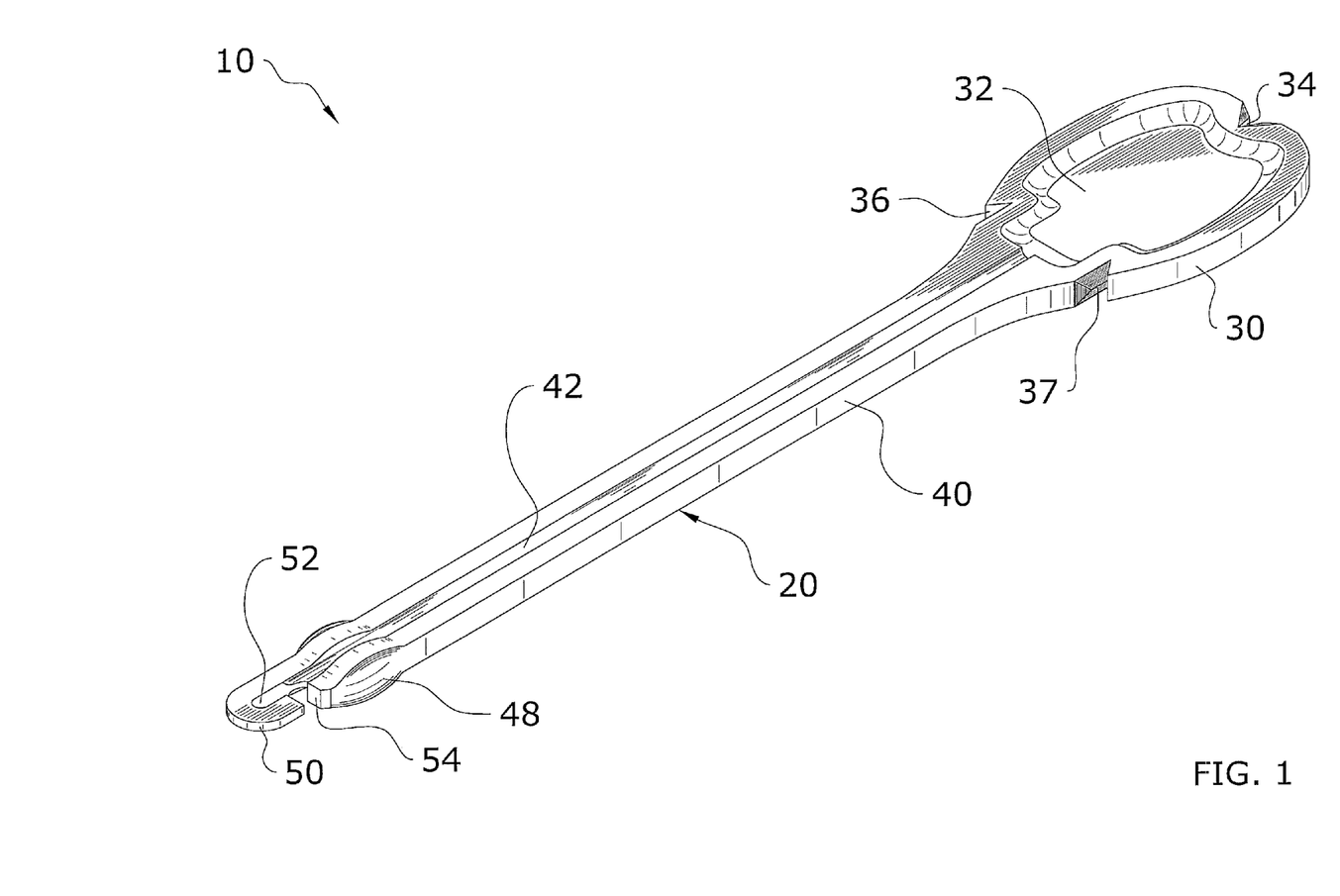
FIG. 1 is an upper perspective view of the present invention.
Figure 2:
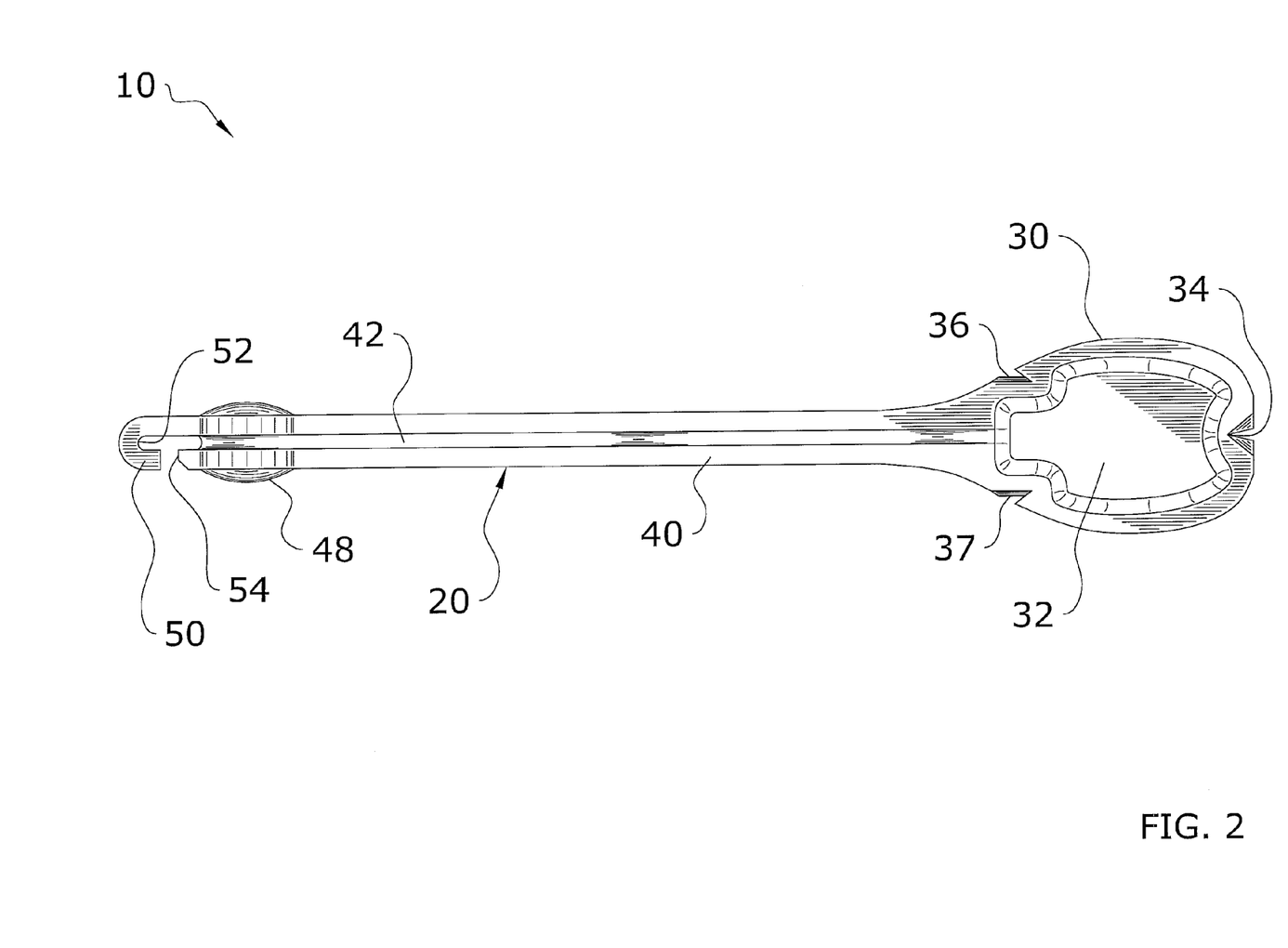
FIG. 2 is a top view of the present invention.
Figure 3:
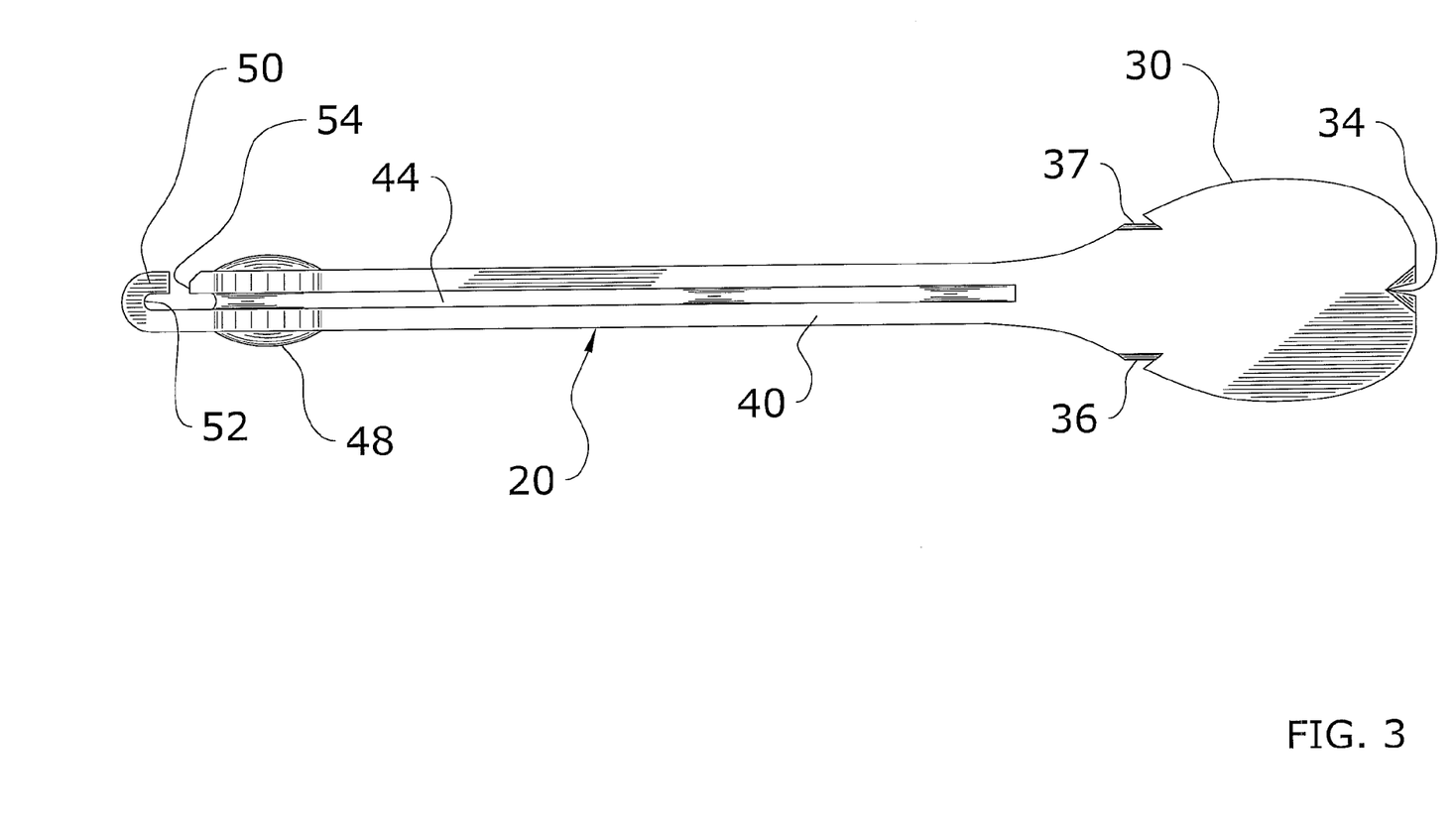
FIG. 3 is a bottom view of the present invention.

The handle 30 is preferably ergonomically formed to be easily grasped by the user. The handle 30 may be comprised of various shaped configurations. In the preferred embodiment of the present invention, the handle 30 is preferably comprised of an ovular shaped structure as illustrated in FIGS. 1 through 3. It is appreciated that the handle 30 may include various indicia or company logos position on the handle 30, wherein the logos or indicia are preferably positioned on the back side of the handle 30 opposite the recessed area 32.

Figure 8:
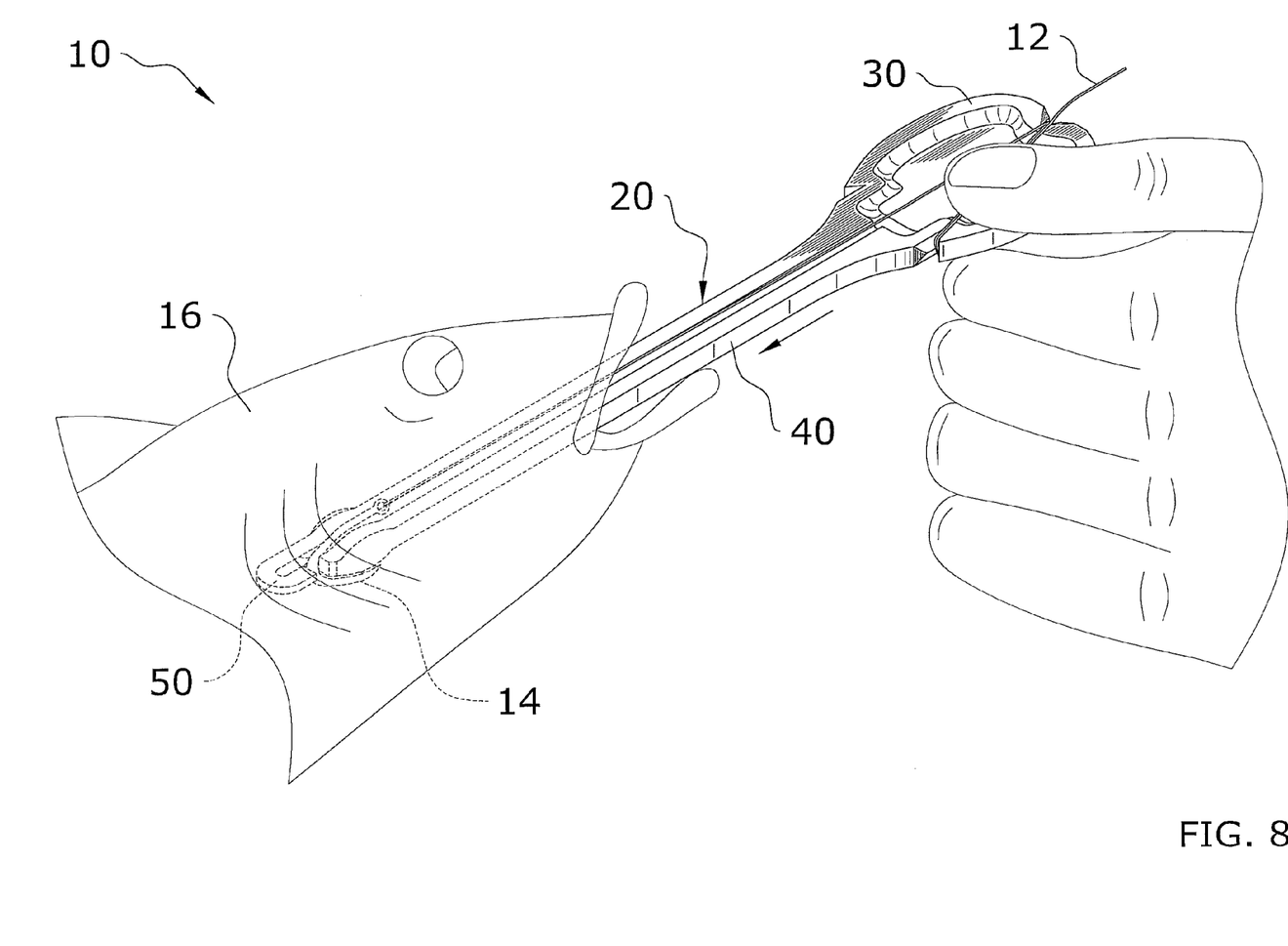
FIG. 8 is an upper perspective view of the present invention in use, wherein the hook is dislodged from the fish.
Figure 9:
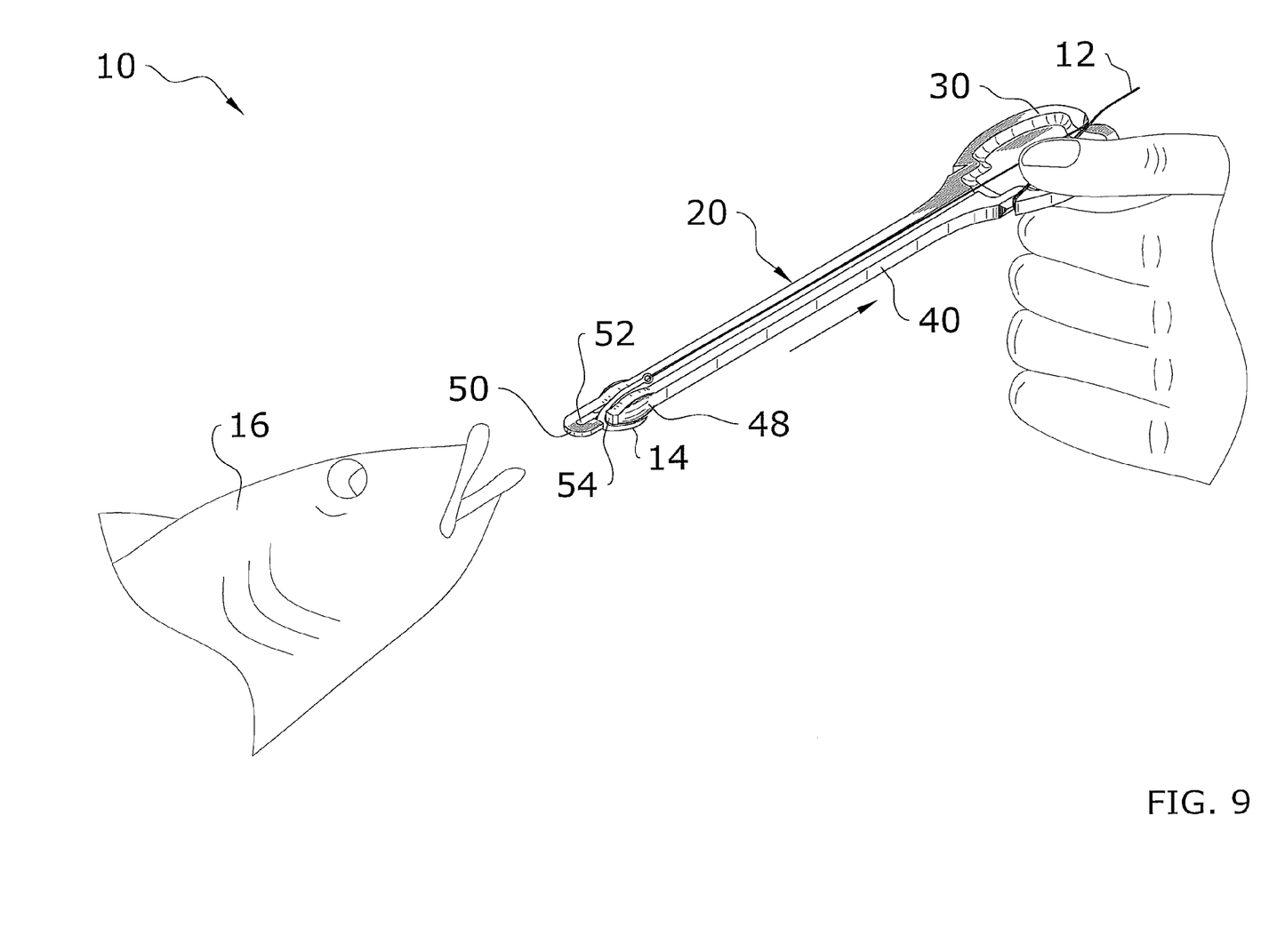
FIG. 9 is an upper perspective view of the present invention in use, wherein the hook is removed from the fish.

The handle 30 preferably includes a recessed area 32 extending within the handle 30 as shown in FIG. 1. The recessed area 32 preferably extends within a substantial area and depth of the handle 30. The recessed area 32 is further preferably large enough for the user to fit their thumb or forefinger within the recessed area 32, wherein the user preferably secures the fishing line 12 upon the present invention by sandwiching the fishing line 12 between their thumb and the recessed area 32 as illustrated in FIGS. 8 and 9.

The handle 30 also preferably includes at least one slit to secure the fishing line 12 upon the handle 30 when removing the hook 14 from fish 16 as shown in FIGS. 1 through 3. In the preferred embodiment of the present invention, the handle 30 preferably includes a first slit 34, a second slit 36 and a third slit 37 as illustrated in FIGS. 1 through 3. The first slit 34 preferably extends within the handle 30 from an outer end of the handle 30 opposite the catch member 50 and the elongated member 40.

The sides of the first slit 34 are preferably slanted so as to efficiently receive the fishing line 12 from opposing sides of the handle 30 when winding the fishing line 12 about the handle 30. The first slit 34 also preferably lies along a longitudinal axis of the channels 42, 44 and the elongated member 40.

The second slit 36 and the third slit 37 preferably extend within the outer edges of the handle 30 substantially opposite the first slit 34. The second slit 36 and the third slit 37 are further preferably oriented towards the first slit 34, wherein the first slit 34, the second slit 36 and the third slit 37 preferably form a tri-symmetrical configuration about the handle 30 as shown in FIGS. 2 and 3.

The second slit 36 and the third slit 37 further preferably mirror each other about the handle 30. The user preferably utilizes either the first slit 34 and the second slit 36 in conjuncture or the first slit 34 and the third slit 37 in conjuncture, wherein utilization of the second slit 36 or the third slit 37 depends on whether the user is right handed or left handed.

ii. Neck

The elongated member 40 extends from the handle 30, wherein the elongated member 40 is preferably integrally formed with the handle 30 as shown in FIGS. 1 through 9. The elongated member 40 further extends from the handle 30 opposite the first slit 34. The elongated member 40 is comprised of an elongated structure, wherein the user is able to reach an adequate depth within the fish 16 via the elongated member 40. The elongated member 40 is also preferably comprised of a thin structure to allow the elongated member 40 to be easily maneuverable within the fish 16.

Figure 4:
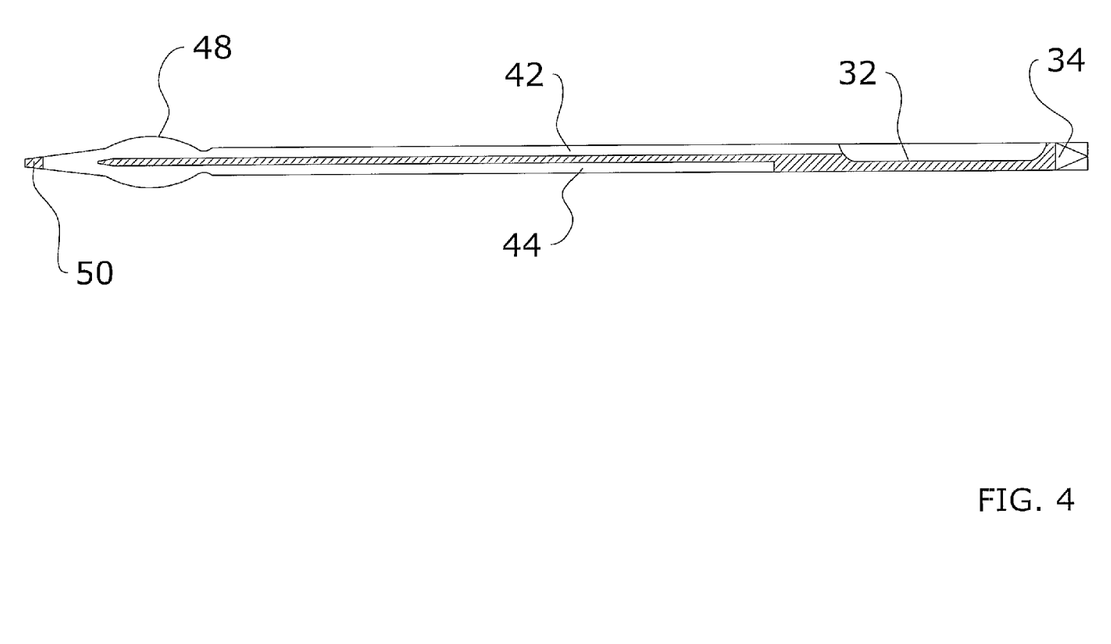
FIG. 4 is a cross-sectional view of the present invention.

The elongated member 40 preferably includes at least one channel 42, 44 extending lengthwise across the elongated member 40. In the preferred embodiment the present invention preferably includes a first channel 42 and a second channel 44, wherein the first channel 42 and the second channel 44 are positioned upon opposite sides of the elongated member 40. The first channel 42 and the second channel 44 also preferably mirror each other as shown in FIG. 4.

The first channel 42 or the second channel 44 receives the fishing line 12 from the catch member 50, wherein the decision to utilize the first channel 42 or the second channel 44 generally depends on if the user is right handed or left handed. The first channel 42 is also preferably coplanar with the recessed area 32 of the handle 30 to provide a smooth transition from the first channel 42 to the recessed area 32 as shown in FIG. 4.

The first channel 42 and the second channel 44 meet adjacent to the catch member 50 and preferably form a substantially pointed configuration. The first channel 42 and the second channel 44 preferably collectively receive the hook 14 when the hook 14 is extended through the opening 52 of the catch member 50 as illustrated in FIGS. 6 through 9.

The elongated member 40 also preferably includes a bulge portion 48 positioned adjacent to the catch member 50 and opposite the handle 30. The bulge portion 48 may be comprised various shaped configurations. In the preferred embodiment of the present invention, the bulge portion 48 is preferably comprised of an ovular shaped structure as illustrated in FIGS. 1 through 4.

The bulge portion 48 preferably extends outwardly from a common plane of the elongated member 40, wherein the bulge portion 48 extends outwardly so as to ensure the hook 14 doesn't protrude outwardly from the elongated member 40 and catch on the fish 16 while removal of the hook 14 from the fish 16. The outer surface of the bulge portion 48 is further preferably flush with the hook 14 when the hook 14 is attached to the elongated member 40 via the channels 42, 44 as illustrated in FIGS. 8 and 9. The bulge portion 48 may also serve as a portion for the hook 14 to grasp onto when utilizing larger hooks 14, such as but not limited to a treble hook 14.

iii. Catch Member

The catch member 50 extends from the elongated member 40, wherein the catch member 50 is preferably integrally formed with the elongated member 40 as shown in FIGS. 1 through 9. The catch member 50 further extends from the elongated member 40 adjacent to the bulge portion 48. The catch member 50 is comprised of a hook 14 structure, wherein the user is able to secure the hook 14 about the catch member 50 when retrieving the hook 14 from the fish 16.

The catch member 50 includes an opening 52 positioned about a center of the catch member 50. The opening 52 is preferably comprised of an elongated structure; however it is appreciated that the opening 52 may be comprised of a circular configuration. The catch member 50 further preferably forms a substantial cincture structure about the opening 52. The opening 52 is preferably comprised of a size large enough to adequately receive a hook 14 as illustrated in FIGS. 6 through 9. The opening 52 may be comprised of various shaped configurations. In the preferred embodiment of the present invention, the opening 52 is preferably comprised of an ovular shaped structure as illustrated in FIGS. 2 and 3.

Figure 5:
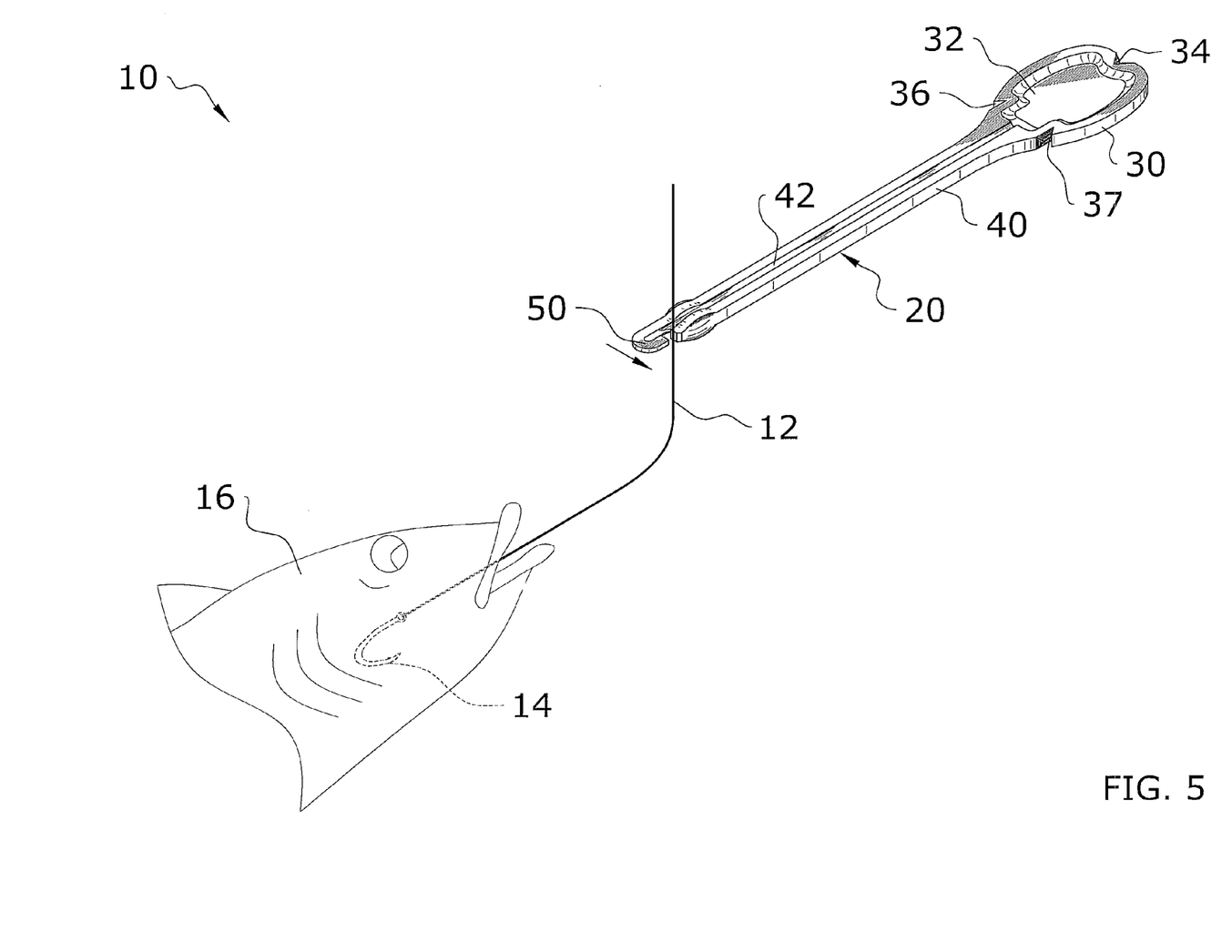
FIG. 5 is an upper perspective view of the present invention in use, wherein the catch member is attached to the fishing line.

The catch member 50 also includes a gap portion 54 extending through the catch member 50 and interconnecting with the opening 52. The gap portion 54 extends through a perimeter of the catch member 50, wherein the fishing line 12 is received within the opening 52 via the gap portion 54 as shown in FIG. 5. The gap portion 54 is preferably slightly larger or substantially similar in width to the diameter of standard fishing line 12, wherein the fishing line 12 is substantially secure within the opening 52 and does not easily slip out of the opening 52 via the gap portion 54.

C. In Use

In use, when a fish 16 is caught and the fish 16 has substantially swallowed the hook 14, the present invention is generally most useful. The fish 16 is preferably held in such a way wherein the fish 16 substantially opens it's mouth (i.e. near the gills). The catch member 50 of the present invention is attached upon the fishing line 12 via extending the fishing line 12 through the gap portion 54 and within the opening 52 as illustrated in FIG. 5.

Figure 6:
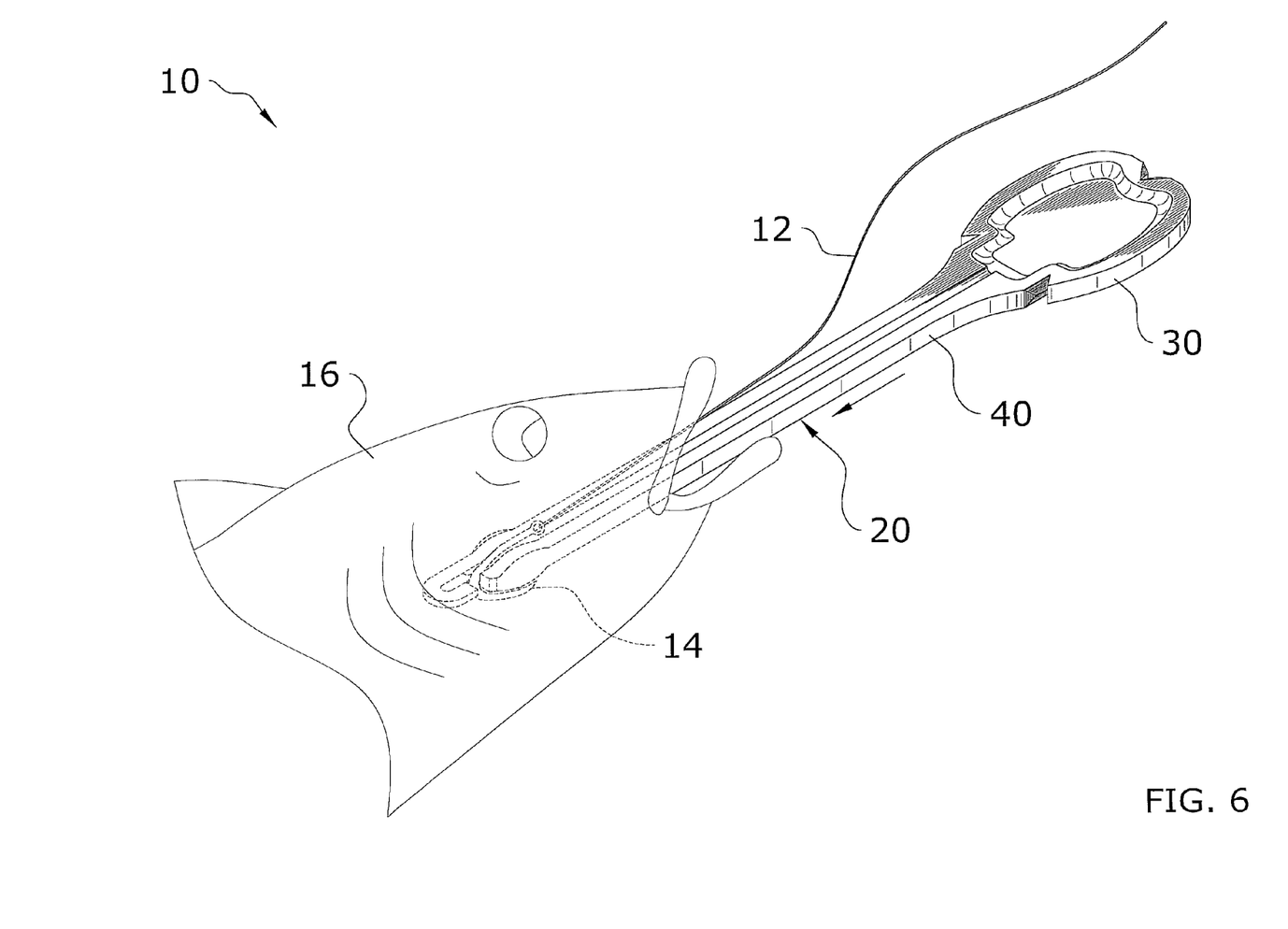
FIG. 6 is an upper perspective view of the present invention in use, wherein the catch member is followed along the fishing line towards the hook.

The present invention is now extended within the fish 16 along the fishing line 12 and through the mouth towards the stomach of the fish 16 until the user reaches the embedded hook 14 with the catch member 50 as illustrated in FIG. 6. The user then pushes slightly forward to secure the hook 14 within the opening 52 and the channels 42, 44.

Figure 7:
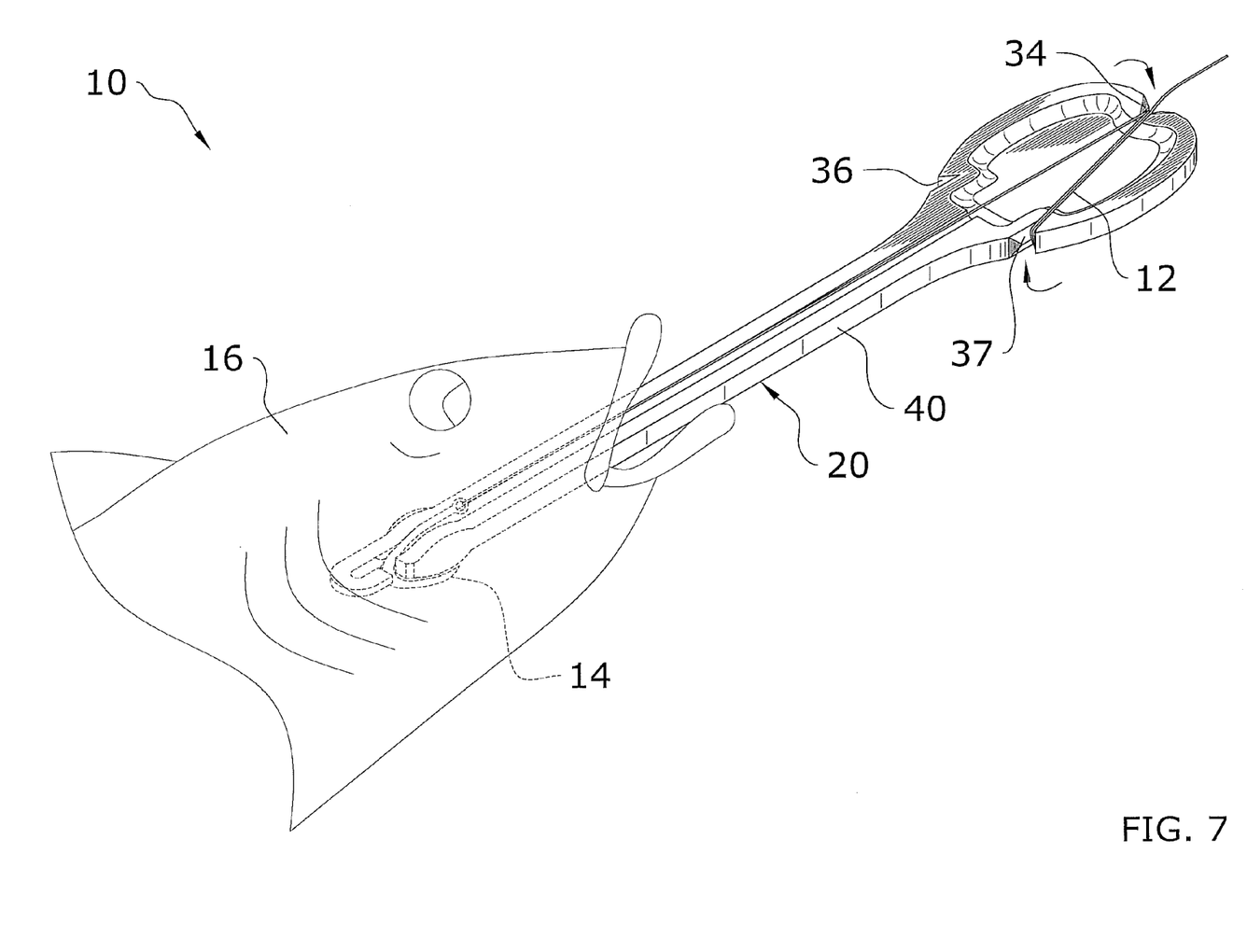
FIG. 7 is an upper perspective view of the present invention in use, wherein the fishing line is secured about the handle.

The user then pulls back on the excess fishing line 12 snugly while aligning the fishing line 12 within the first channel 42 or the second channel 44 as shown in FIG. 7. The fishing line 12 is then extended from the first channel 42 or the second channel 44 across the handle 30 and within the first slit 34. Depending on preference and comfort of the user the fishing line 12 is then wrapped around the handle 30 via the second slit 36 or the third slit 37. The fishing line 12 may be continued to be winded around the handle 30 until the fishing line 12 is secured upon the present invention as illustrated in FIG. 7.

The wound portion of the fishing line 12 is now firmly sandwiched between the user's thumb or forefinger and the recessed area 32. The user then exerts a short thrust upon the present invention toward the fish 16 to dislodge the hook 14 from the fish 16 as illustrated in FIG. 8. The user then gently and carefully removes the dislodged hook 14 from the fish 16 so as to not resnag the hook 14 within the fish 16 as illustrated in FIG. 9. This fishing line 12 and hook 14 may now be unwound and removed from the present invention and the process is simply repeated for future fish 16 that are caught.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A fish hook remover system, comprising:
an elongated member including a first end, a second end and at least one channel, wherein said at least one channel extends lengthwise across said elongated member;
wherein said elongated member includes a bulge portion adjacent to said first end and wherein said at least one channel extends through said bulge portion;
wherein said bulge portion extends outwardly from said elongated member;
a catch member extending from said first end of said elongated member, wherein a substantial portion of said bulge portion is positioned between said catch member and said elongated member;
wherein said bulge portion radiates outwardly from said common outer plane of said elongated member;
wherein said bulge portion is comprised of an ovular shaped configuration;
wherein said at least one channel includes a first channel and a second channel;
wherein said first channel extends lengthwise along a first side of said elongated member and wherein said second channel extends lengthwise along a second side of said elongated member, wherein said first side is opposite said second side;
wherein said first channel and said second channel extend through said bulge portion;
wherein said first channel and said second channel interconnect with an opening formed by said catch member;
wherein said opening interconnects with a gap portion formed between a perimeter of said catch member and a bulge portion; and
a handle including at least one slit, wherein said handle extends from said elongated member opposite said catch member;
wherein said handle includes a recessed area extending within said handle;
wherein said at least one slit includes a first slit and a second slit;
wherein said second slit is oriented towards said first slit;
wherein said at least one slit includes a third slit, wherein said first slit, said second slit and said third slit form a tri-symmetrical configuration about said handle;
wherein said catch member is comprised of a hook configuration.

* * * * *